United States Patent
Soler León et al.

(10) Patent No.: US 12,214,963 B2
(45) Date of Patent: Feb. 4, 2025

(54) FRUIT AND VEGETABLE CONVEYOR MACHINE

(71) Applicant: ICZIA ENGINEERING S.L., Valencia (ES)

(72) Inventors: Irene Soler León, Valencia (ES); Juan Diego Díaz López, Valencia (ES)

(73) Assignee: Iczia Engineering S.L., Valencia (ES)

( * ) Notice: Subject to any disclaimer, the term of this patent is extended or adjusted under 35 U.S.C. 154(b) by 47 days.

(21) Appl. No.: 18/252,444

(22) PCT Filed: Nov. 8, 2021

(86) PCT No.: PCT/ES2021/070802
§ 371 (c)(1),
(2) Date: May 10, 2023

(87) PCT Pub. No.: WO2022/101532
PCT Pub. Date: May 19, 2022

(65) Prior Publication Data
US 2024/0025649 A1 Jan. 25, 2024

(30) Foreign Application Priority Data
Nov. 11, 2020 (ES) .................................. P202031134

(51) Int. Cl.
*B65G 15/14* (2006.01)
*B65G 17/24* (2006.01)
(Continued)

(52) U.S. Cl.
CPC ............. *B65G 15/14* (2013.01); *B65G 17/24* (2013.01); *B65G 17/44* (2013.01); *B65G 21/22* (2013.01);
(Continued)

(58) Field of Classification Search
CPC ........ B65G 15/14; B65G 17/44; B65G 21/22; B65G 47/22; B65G 47/24; B65G 47/244;
(Continued)

(56) References Cited

U.S. PATENT DOCUMENTS 3,910,404 A * 10/1975 Henrekson ........... B65G 17/385
198/779
4,078,654 A * 3/1978 Sarovich ................ B65G 17/42
198/804
(Continued)

FOREIGN PATENT DOCUMENTS

EP 2921432 A1 9/2015
ES 2062920 A2 12/1994
(Continued)

OTHER PUBLICATIONS

International Search Report for PCT/ES2021/070802, mailed on Dec. 20, 2021, 3 pages.
(Continued)

*Primary Examiner* — Mark A Deuble
(74) *Attorney, Agent, or Firm* — Sterne, Kessler, Goldstein & Fox P.L.L.C.

(57) ABSTRACT

The present invention discloses a fruit and vegetable conveyor machine having a traction cable whereon a number of rotating elements are suspended which travel along mechanised rails to determine their path. The advance of the fruits and vegetables is generated by the translation and a continuous rotation of the rotating elements that form at least one circuit associated with the traction cable, which moves defining a conveying speed of the rotating elements. The configuration of the machine enables the differentiation of an alignment area which includes corresponding opposite-facing belts, forming a V, and in movement, and an area for the inspection of the fruit or vegetable conveyed, where the rotating elements are illuminated with a colour that may be
(Continued)

selected so as to enable the differentiation of the background image from the product.

8 Claims, 5 Drawing Sheets

(51) Int. Cl.
   *B65G 17/44* (2006.01)
   *B65G 21/22* (2006.01)
   *B65G 37/00* (2006.01)
   *B65G 47/244* (2006.01)
(52) U.S. Cl.
   CPC ........ *B65G 47/2445* (2013.01); *B65G 37/005* (2013.01); *B65G 2201/0211* (2013.01)
(58) Field of Classification Search
   CPC .............. B65G 47/2445; B65G 37/005; B65G 21/2054; B65G 47/841; B65G 2201/0211; B65G 17/32; B65G 17/24
   See application file for complete search history.

(56) References Cited

U.S. PATENT DOCUMENTS

| | | | | |
|---|---|---|---|---|
| 4,482,061 A | * | 11/1984 | Leverett | B07C 5/18 209/912 |
| 4,726,898 A | * | 2/1988 | Mills | B65G 47/24 209/939 |
| 5,040,667 A | | 8/1991 | Kamita | |
| 5,855,270 A | * | 1/1999 | Throop | A23N 15/00 209/912 |
| 5,865,291 A | * | 2/1999 | Affeldt | B65G 47/846 198/779 |
| 6,148,989 A | * | 11/2000 | Ecker | B07B 13/05 209/912 |
| 8,061,503 B2 | * | 11/2011 | Ancarani | B65G 47/2445 198/398 |
| 9,475,643 B1 | | 10/2016 | Odman et al. | |
| 11,254,508 B2 | * | 2/2022 | Benedetti | B65G 17/24 |
| 2011/0309004 A1 | | 12/2011 | Morley | |
| 2013/0334109 A1 | * | 12/2013 | Liedl | B07C 5/16 209/545 |
| 2015/0283585 A1 | | 10/2015 | Pasalodos | |

FOREIGN PATENT DOCUMENTS

| | | |
|---|---|---|
| ES | 2393561 A1 | 9/2010 |
| FR | 2814383 A1 | 3/2002 |
| FR | 2927007 A1 | 8/2009 |
| WO | 2009049202 A1 | 4/2009 |
| WO | 2013131141 A1 | 9/2013 |
| WO | 2016201372 A1 | 12/2016 |

OTHER PUBLICATIONS

Extended European Search Report for EP Application No. EP21891285, mailed Sep. 24, 2024, 9 pages.

* cited by examiner

FRUIT AND VEGETABLE CONVEYOR MACHINE

CROSS-REFERENCE

This application claims priority to PCT/ES2021/070802, filed Nov. 8, 2021, which claims priority to ES202031134, filed Nov. 11, 2020. Each of these applications is incorporated herein in its entirety by reference thereto.

DESCRIPTION

Object of the Invention

The present invention relates to a machine that enables the conveyance, alignment, and inspection of the product, whether they are fruits and/or vegetables.

The object of the invention is to offer a simple configuration made up of at least one circuit having a plurality of rotating elements having a path that can be modified, whereon the product to be conveyed rests and where the rotating elements rotate their 360° turn so as to allow a complete inspection of the fruits and/or vegetables housed thereon.

BACKGROUND OF THE INVENTION

Known fruit and vegetable conveyor systems which are widely used in manual inspection benches or in sorting machines using machine vision are based on a conveyor and turning system arranged below the machine vision systems to facilitate the work thereof. Once the product to be conveyed has passed through the area for inspection, the conveyor system continues along the entire machine, with its subsequent higher weight, price, and inadequacy for the system of customized outlets which known machines have.

In most of the known machines, in the conveying of the receptacles, rotating elements, cones, or other elements particularly adapted to the product to be conveyed, these are coupled to a rigid chain or belt forming links. The mentioned rigid chain is driven between two shafts which, by turning, cause the chain to advance.

One of the relevant drawbacks relating to the use of chains in known conveyor machines resides in the limitation of the degrees of freedom in the design of the circuit to be travelled.

Based on the foregoing, the applicant of the present patent application has detected the need to develop a fruit and vegetable conveyor machine which includes a traction element that is not rigid, enabling a configuration that can be readily adapted to the size and shape of the product to be conveyed.

DESCRIPTION OF THE INVENTION

The conveyor machine disclosed herein enables the drawbacks set forth above to be overcome, offering a mechanically simple and very effective solution for the conveying and processing of a product, whether they are fruits and/or vegetables.

Advantageously, the machine is highly versatile for being adapted to the size of the product to be conveyed and its configuration assures a minimum product transfer height between the area for inspection and the outlet band.

Specifically, the conveyor machine of the invention has two differentiated areas, an alignment area next to the product inlet and an area for inspection after the alignment area.

In that sense, the conveyor machine is made up of at least the following elements:

- at least one traction cable;
- at least two crown wheels with slots, with the crown wheels being associated such that there is arranged thereon a traction cable defining at least one circuit along which the traction cable travels;
- a plurality of rotating elements, where each rotating element is associated with a stud bolt going through same to enable the rotation of the rotating element on the stud bolt;
- a plurality of connection elements, with each connection element having a perforation, a notch, and a channel perpendicular to the perforation, such that the connection elements are suspended on the traction cable through the perforations, with each connection element being arranged associated with the channel of a shaft which provides support to the rotating element;
- a mechanised rail arranged along one side of the circuit, and where the mechanised rail is in the form of a clamp internally having projections and a friction belt, such that the notches of the connection elements travel over the projections of the mechanised rail and the rotating elements rest on the friction belt to generate the rotation on themselves.

Advantageously, the assembly consisting of the mechanised rail, the connection element, and the stud bolt provides rigidity and guides the movement of the rotating element on the horizontal and vertical axes, preventing the weight of the product from changing the position of the traction cable, causing the path of the product located on the rotating element to vary. In fact, the stud bolt inserted into the rotating element constitutes its rotation shaft. Simultaneously, the rotating element rests on the friction belt located on the mechanised rail such that the rubbing of the surface of the rotating element with respect to the friction belt causes the rotation of the rotating element on itself.

In that sense, it should be noted that the contact point of the rotating element on the friction belt determines the rotating speed of the rotating element.

In that sense, the product advances as it is supported between the rotating elements of the circuit associated with the traction cable.

The pair of crown wheels with slots turns, defining the conveying speed of the rotating elements suspended on the traction cable. In that sense, the configuration of the machine of the invention enables independent modification of the conveying speed of the rotating elements (defined by the movement of the crown wheels associated with the traction cable) and the rotating speed of the rotating elements on themselves (defined by the contact point of the rotating element on the friction belt of the mechanised rail and the travelling speed of the friction belt).

On the other hand, in the alignment area of the machine of the present invention, there are at least two belts in movement. Each of the mentioned belts is opposite-facing, forming a V; the angle of inclination of the belts could be adjusted based on the needs of the product to be conveyed.

In a suitable manner, the movement speed of the belts is less than the conveying speed of the rotating elements, i.e., the belts forming a V advance at a speed that is lower than the conveying speed of the rotating elements, assuring that a single product will be positioned in a rotating element at all times.

After the alignment area, the product reaches the area for inspection. Given that the products to be conveyed will have different colours, it is convenient for the product to stand out from the background and from the rotating elements, for which the present invention discloses the implementation of rotating elements made of a translucent material, which elements will be illuminated in the area for inspection by LEDs, preferably LEDs with a colour that may be selected. These LEDs are located in the mechanised rail facing the rotating elements such that the light is refracted upon penetrating same, illuminating the lower part of the rotating element, whereby enabling the suitable selection of the colour of the rotating element, facilitating the customisation of the product by the inspection personnel or equipment which can be situated above the machine object of the invention.

After the area for inspection, the path of the rotating elements conveying the already inspected product changes upon modification, in the mechanised rail, of the track guiding the connection elements, while the position of the crown wheels and the traction cable associated with said crown wheels is lowered at the same time.

In that sense, the position of the crown wheels, the track of the mechanised rail, and the traction cable enables the path of the rotating elements to be lowered in order to move closer to a subsequent conveyor belt (which is not the object of protection) arranged in the outlet area of the machine of the invention.

That is, the rotating elements are kept in a horizontal position, i.e. with the rotation shafts parallel to the ground, during the advance through the alignment area and the area for inspection of the machine, whereas in the outlet area of the machine in which the mechanised rail is no longer present, the position of the rotating elements is modified, lowering them, and where their rotation shaft is no longer positioned horizontally with respect to the ground, such that it enables gently driving the conveyed fruit to a subsequent belt.

Optionally, the machine of the invention can have two circuits defined by corresponding pairs of crown wheels with slots and two traction cables. In this embodiment, the two circuits travel in the opposite direction and synchronously, with the rotating elements of each circuit being arranged facing each other, as will be described in detail in the second preferred embodiment.

The advantage of the configuration of the machine of the invention resides in the adjustability of the position in terms of the distance between the pair of crown wheels defining the circuit or path of the rotating elements suspended on the traction cable. Likewise, this particularity enables the adaptability of the machine of the invention in order to offer a larger distance between each circuit when two circuits are present, favouring the conveying of a larger range of diameters or lengths of the product to be conveyed.

Lastly, it should be noted that the configuration of the conveyor machine of the invention facilitates replacement of the rotating elements with elements having a different size by means of an easy operation. In that sense, each rotating element can be removed and replaced with others of a larger or smaller size, as appropriate, by inserting the suitable number of rotating elements at the suitable distance from the product to be conveyed; the present invention thereby enables an increase in the separation between the rotating elements of a circuit, so the range of conveyable products is greatly expanded, being a very competitive solution with respect to other known machines with rigid conveyor circuits by means of guided chain.

BRIEF DESCRIPTION OF THE DRAWINGS

To complement the description that will be provided below and for the purpose of helping to better understand the features of the invention according to a preferred practical exemplary embodiment thereof, a set of drawings is attached as an integral part of said description, in which the following is depicted in an illustrative and non-limiting manner.

PREFERRED EMBODIMENT OF THE INVENTION

Figure 1:
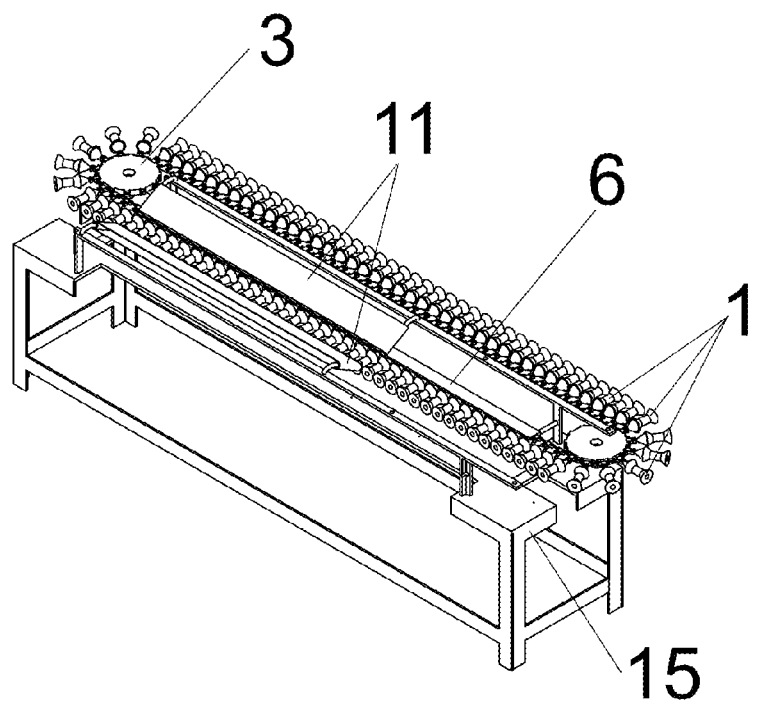
FIG. 1 shows a perspective view of the fruit and vegetable conveyor machine carried out according to a first preferred embodiment of the object of the present invention.
Figure 2:
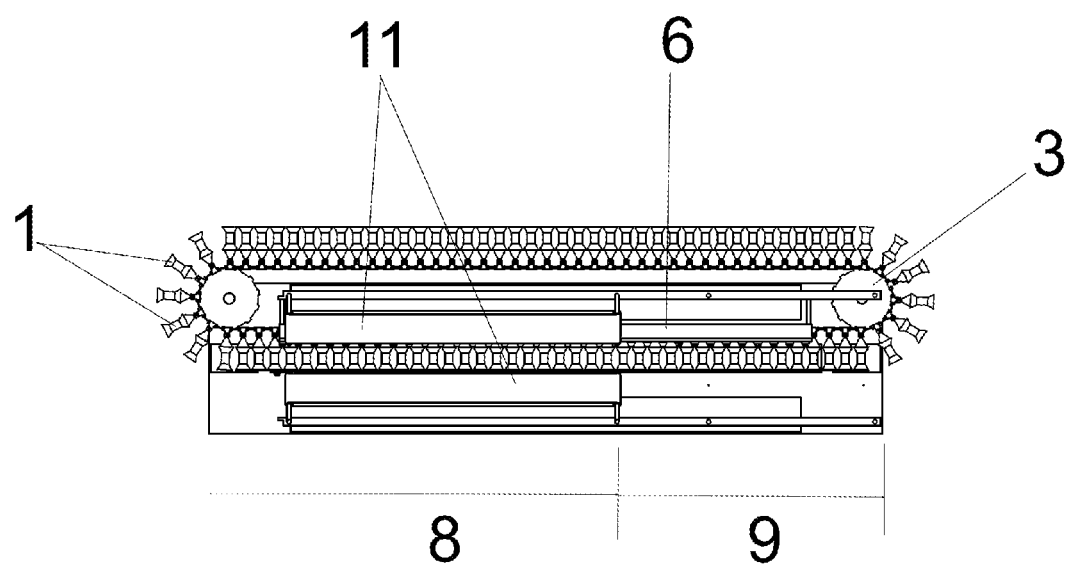
FIG. 2 shows a top view of the conveyor machine depicted in FIG. 1.
Figure 3:
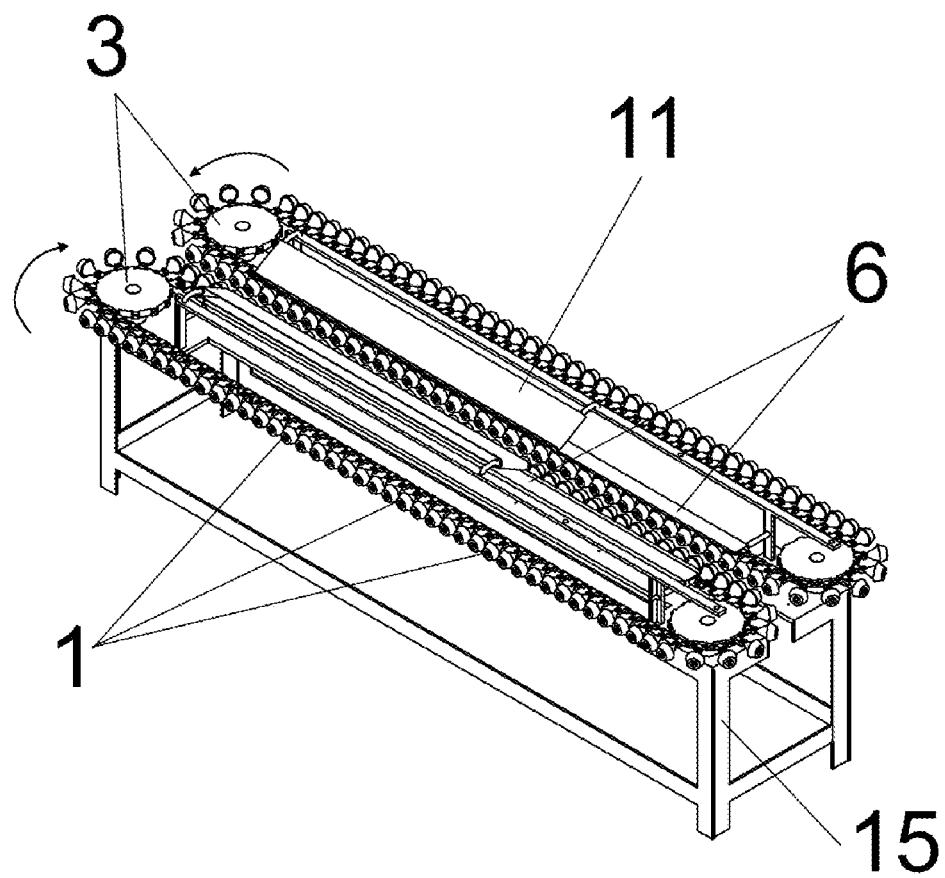
FIG. 3 shows a perspective view of the fruit and vegetable conveyor machine carried out according to a second preferred embodiment of the object of the present invention.
Figure 4:
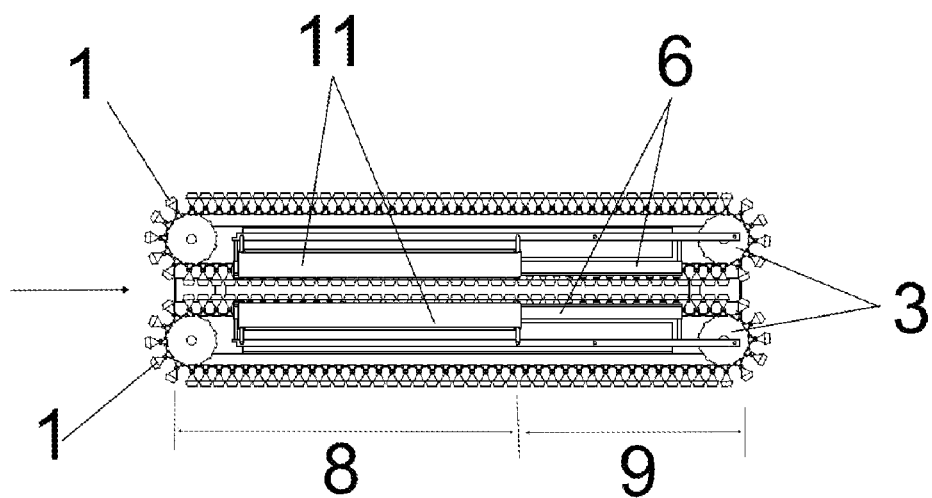
FIG. 4 shows a top view of the conveyor machine depicted in FIG. 3.
Figure 9:
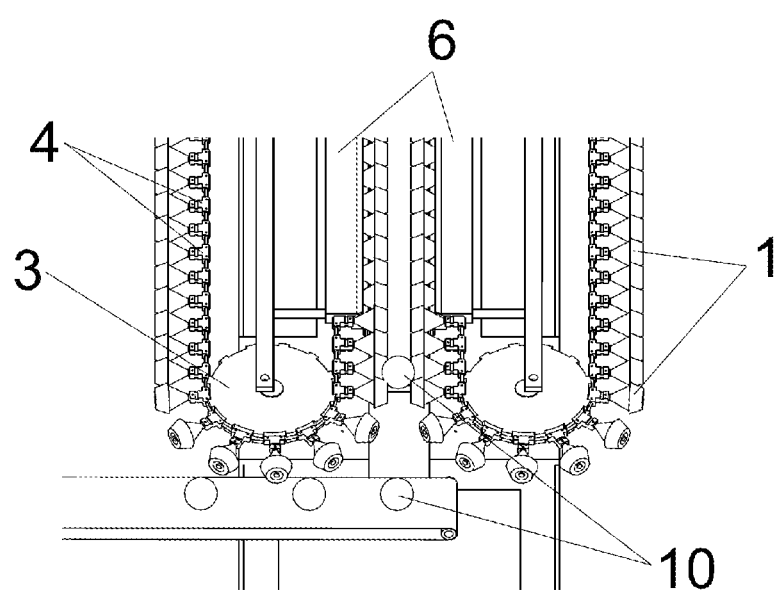
FIG. 9 shows a detail of the outlet for the product from the conveyor machine according to the second preferred embodiment of the invention.

FIGS. 1 and 2 depict the first preferred embodiment of the invention, whereas FIGS. 3, 4, and 9 depict the second preferred embodiment of the conveyor machine object of the present invention.

In view of FIGS. 1 and 3, it can be seen that in any of the preferred embodiments, the machine is made up of a structure that rests on a support (15).

FIGS. 2 and 4 depict a top view of the machine of the invention in its first and second preferred embodiments, respectively, where the inlet area for the fruit and/or vegetable to be conveyed (product (10)), the alignment area (8), and the area for inspection (9) are identified.

A plurality of rotating elements (1) and a plurality of connection elements (4) are involved in any of the preferred embodiments of the fruit and vegetable conveyor machine of the invention.

As observed in the first preferred embodiment of the invention (FIGS. 1 and 2), the machine has a traction cable (2) and two crown wheels (3) with slots. In that sense, the crown wheels (3) are associated such that there is arranged thereon a traction cable (2) defining a circuit along which the mentioned traction cable (2) travels.

On the other hand, in the second preferred embodiment of the invention (FIGS. 3 and 4), the machine has two traction cables (2) and four crown wheels (3) with slots. The crown wheels (3) with slots are thereby associated in pairs, such that on each pair of crown wheels (3) there is arranged one of the traction cables (2) defining a circuit. That is, the second preferred embodiment of the machine of the invention has two circuits associated with two traction cables (2), respectively, travelling in the opposite direction and synchronously, as indicated in FIG. 3.

Advantageously, the second embodiment of the invention enables the modification of the distance between the two facing circuits, so the range of conveyable products is greatly expanded.

Figure 5:
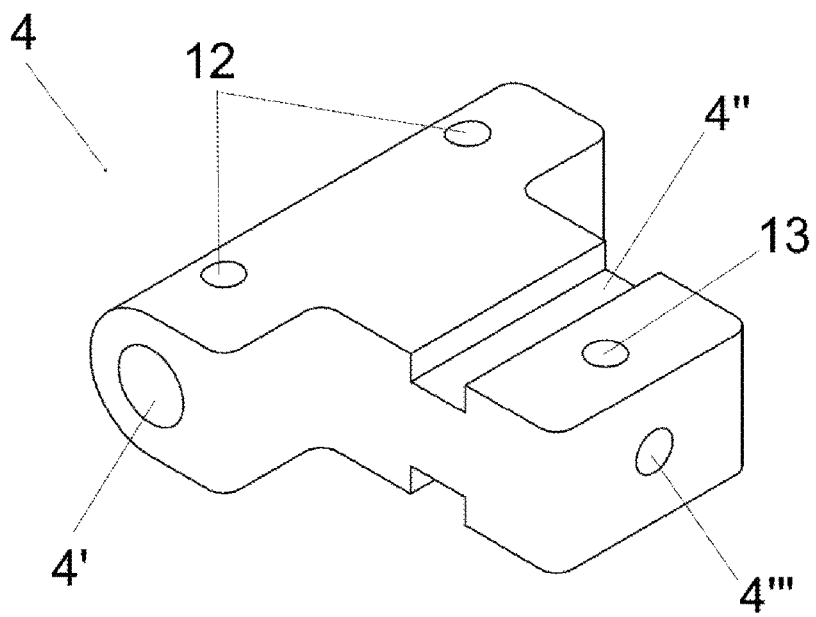
FIG. 5 shows a perspective view depiction of the connection element that is part of the conveyor machine according to any of the preferred embodiments of the invention.

FIG. 5 depicts a connection element (4) involved in any of the preferred embodiments of the invention and preferably being T-shaped. Each connection element (4) has a perforation (4'), a notch (4"), and a channel (4''') perpendicular to the mentioned perforation (4').

Figure 6:
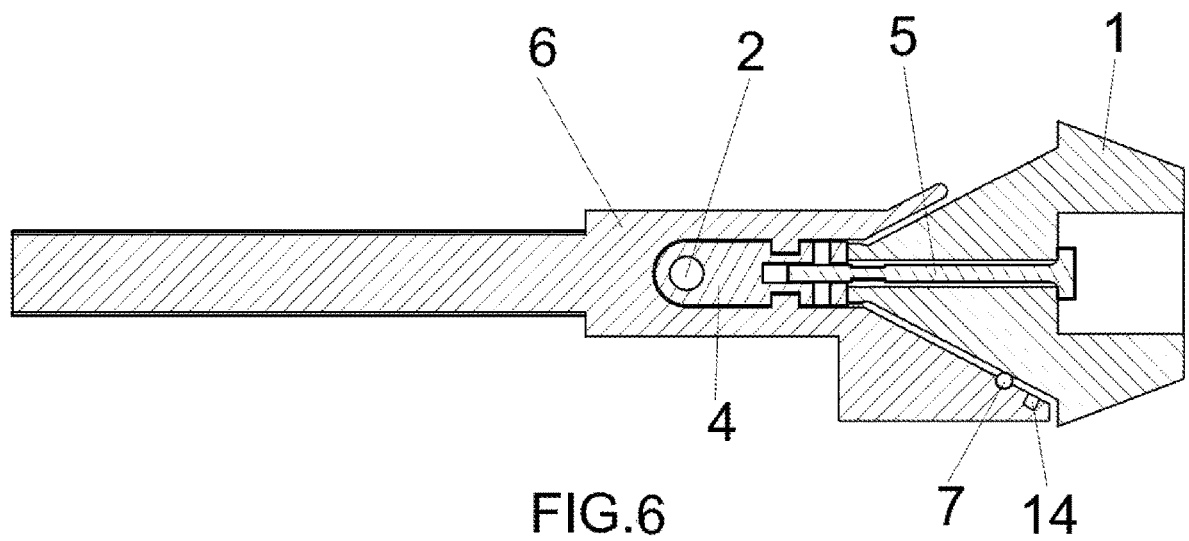
FIG. 6 shows a sectional view of the mechanised rail where the clamp shape along which a connection element which is associated with a rotating element by means of a stud bolt travels can be seen, with all of them being part of the conveyor machine in any of the preferred embodiments of the invention.

As observed in FIG. 6, in any of the preferred embodiments of the invention, the preferred shape of the rotating element (1) is a cone. In that sense, each rotating element (1), regardless of the external shape it has, is associated with a stud bolt (5) going through same to enable the rotation of the rotating element (1) on the stud bolt (5). Likewise, it can be seen in FIG. 5 that a traction cable (2) is inserted through the perforation (4') of the connection element (4).

Figure 7:
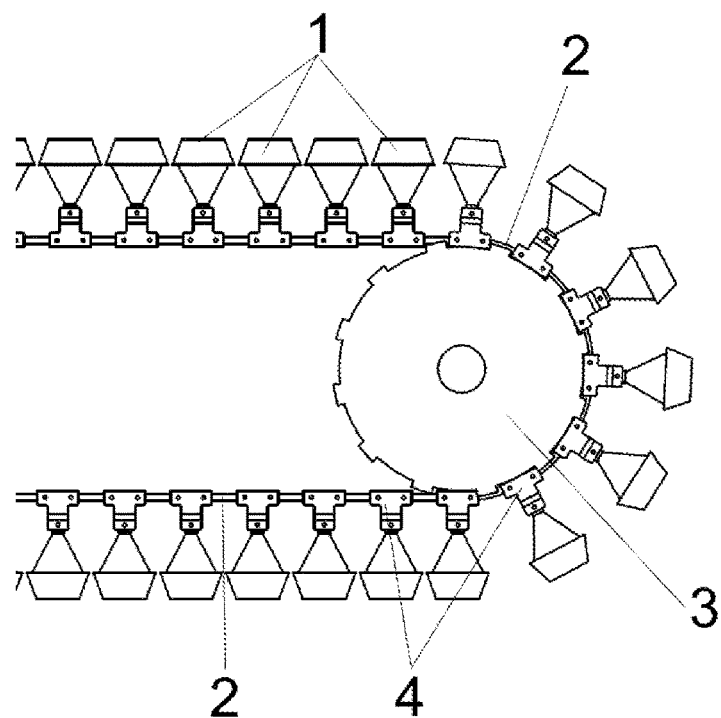
FIG. 7 shows a partial top view of a crown wheel whereon there rests the traction cable on which a plurality of connection elements and rotating elements are suspended according to any of the preferred embodiments of the invention.

It can be seen in FIGS. 6 and 7 that in any of the preferred embodiments of the invention, the connection elements (4) are suspended on the traction cables (2) through the perforations (4'). In that sense, each connection element (4) is associated with the channel (4") of a rotating element (1) by means of the stud bolt (5). Therefore, the machine of the invention has the same number of connection elements (4) as it does rotating elements (1).

On the other hand, the notch (4") of the connection element (4) enables the latter to be associated with a mechanised rail. Specifically, the first preferred embodiment of the machine of the invention has one mechanised rail (6) as it has only one circuit. This mechanised rail (6) is arranged along one side of the circuit, as observed in FIGS. 1 and 2.

On the other hand, the second preferred embodiment of the invention has mechanised rails (6) arranged on the two opposite-facing circuits.

Figure 8:
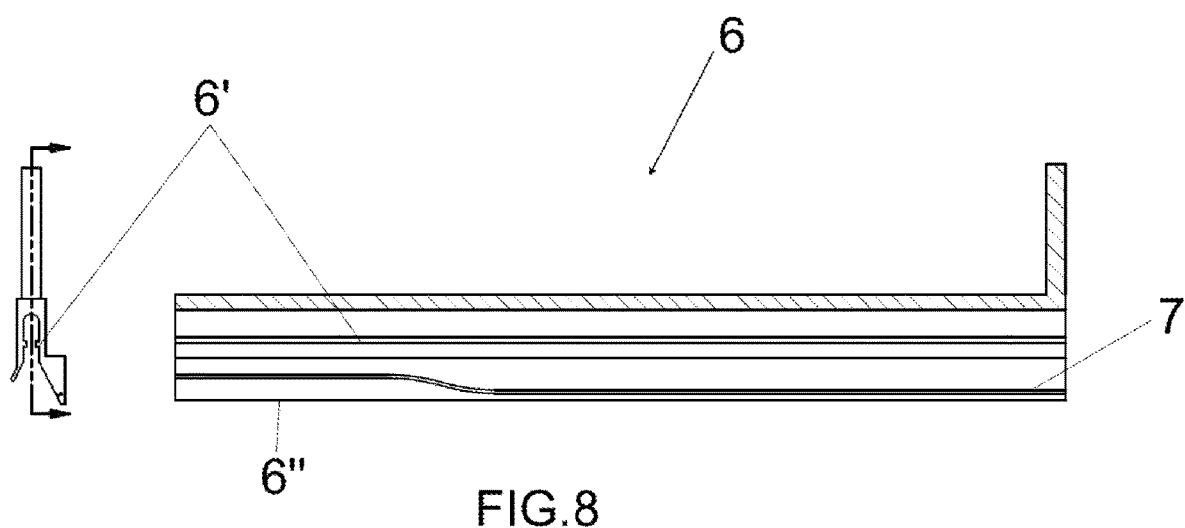
FIG. 8 shows a partial top view of the mechanised rail that is part of the conveyor machine according to any of the preferred embodiments.

FIG. 8 shows that in any of the preferred embodiments of the invention each mechanised rail (6) is in the form of a clamp internally having projections (6') and a friction belt (7), such that the notches (4") of the connection elements (4) travel over the projections (6') of each mechanised rail (6) and the rotating elements (1) rest on the friction belt (7) to generate the rotation on themselves.

In both preferred embodiments of the invention, in FIGS. 2 and 4, the alignment area (8) of the machine has at least two belts (11) in movement, with each one being opposite-facing, forming a V, and with the presence thereof being limited to the alignment area (8). In both preferred embodiments, the angle of inclination formed by the belts forming a V could be adjusted based on the needs of the product to be conveyed.

To understand the movement conveyed to the product (10) to be processed through any of the preferred embodiments of the machine of the invention, it should be noted that each pair of crown wheels (3) moves defining a conveying speed of the rotating elements (1) suspended on the traction cables (2) of the circuit. In this way, the movement speed of the belts (11) is less than the conveying speed of the rotating elements (1) in order to offer a surface where product (10) accumulates.

Advantageously, in the second preferred embodiment of the invention, the presence of V-shaped belts (11) offers a larger surface where the product (10) can accumulate for the purpose of favouring its proper alignment and arrangement to immediately move on to the area for inspection (9).

Optionally, in any of the preferred embodiments of the invention, the mechanised rail (6) in the area for inspection (9) has LEDs (14) which project illumination onto the rotating elements (1) which are optionally made of a translucent material. A contrast is thereby generated between the products (10) and the illuminated translucent rotating element (1), with this contrast being even more intense as the rotating elements (1) are made of a translucent material. Advantageously, the presence of complementary vision means (not depicted in the figures attached hereto) in the area for inspection (9) facilitates the capture and analysis of images for the verification of the state of the product (10) conveyed through the machine of the invention.

On the other hand, it should be noted that in any of the preferred embodiments of the invention, the friction belt (7) defines a path along the inner surface of the mechanised rail (6). As observed in FIG. 8, the friction belt (7) is optionally located on said inner surface of the mechanised rail (6) in different positions. Specifically, the friction belt (7) is located farther away from the edge (6") in the alignment area (8) and is located closer to the edge (6") of the mechanised rail (6) in the area for inspection (9). The change in position of the friction belt (7) along the inner surface of the mechanised rail (6) thereby modifies the rotating speed of the rotating element (1), by changing the support point of the friction belt (7) with respect to the surface of the rotating element (1). Thus, the rotating speed of the rotating element (1) will be lower in the area for inspection (9) since the friction belt (7) comes into contact with the rotating element in an area of larger diameter, so that optionally in the second preferred embodiment, different paths of the friction belt (7) located inside each mechanised rail (6) will have, corresponding thereto, different angular speeds for each rotating element (1) with respect to its facing counterpart (1), making it possible for the rotating elements (1) to turn at different angular speeds at the same point of advance of the product (10), causing the product (10) to rotate additionally on itself.

Lastly, FIG. 9 depicts in detail the outlet of the product (10), whether it is a fruit or a vegetable, in the second preferred embodiment of the invention after processing. This figure shows the two circuits formed by two traction cables (2) associated with two pairs of crown wheels (3) with slots and that the processed product (10) travels between the two circuits defined by the set of crown wheels (3) with slots and the traction cables associated with a plurality of rotating elements (1).

In that sense, the product (10) comes into contact with the outer surface of the rotating element (1), which is in a continuous rotation and favours the advance and rotation of the product (10) through the alignment area (8) and the area for inspection (9) until exiting the machine, as depicted in FIG. 9.

Lastly, it should be indicated that in any preferred embodiment of the invention, the traction cables (2) are preferably made of steel.

The invention claimed is:

1. A fruit and vegetable conveyor machine having an alignment area and an area for inspection, said machine comprising:
    at least one traction cable;
    at least two crown wheels with slots, wherein a traction cable defining a circuit along which the traction cable travels is arranged on the crown wheels;
    a plurality of rotating elements, wherein each rotating element is associated with a stud bolt going through same to facilitate rotation of the rotating element on the stud bolt;

a plurality of connection elements, with each connection element having a perforation, a notch, and a channel perpendicular to the perforation, wherein the connection elements are suspended on the traction cable through the perforations, with each connection element being associated with the channel of a rotating element by the stud bolt; and a mechanised rail arranged along one side of the circuit, wherein the mechanised rail is in the form of a clamp internally having projections and a friction belt, such that the notches of the mechanised rail and the rotating elements rest on the friction belt to facilitate the rotation on themselves, wherein each pair of crown wheels turns, defining a conveying speed of the rotating elements suspended on the traction cables, and wherein the alignment area has at least two belts in movement with each one being opposite-facing, forming a V, with a movement speed of the belts being less than the conveying speed of the rotating elements.

2. The fruit and vegetable conveyor machine according to claim 1, wherein the machine has two traction cables and four crown wheels with slots, the crown wheels being associated in pairs, wherein a traction cable is arranged on each pair of crown wheels, the traction cable defining two circuits associated with corresponding traction cables travelling in the opposite direction and synchronously, a plurality of rotating elements, a plurality of connection elements, and mechanised rails arranged facing each other, and wherein each pair of crown wheels moves to define the conveying speed of the rotating elements suspended on the traction cables.

3. The fruit and vegetable conveyor machine according to claim 1, wherein the connection element is T-shaped.

4. The fruit and vegetable conveyor machine according to claim 1, wherein the machine has the same number of connection elements as it does rotating elements.

5. The fruit and vegetable conveyor machine according to claim 1, wherein the rotating elements are made of a translucent material, and the mechanised rail has LEDs located in the area for inspection to project illumination onto the rotating elements.

6. The fruit and vegetable conveyor machine according to claim 1, wherein the friction belt defines a path along an inner surface of the mechanised rail, such that the friction belt is located farther away from the edge in the alignment area and is located closer to the edge of the mechanised rail in the area for inspection.

7. The fruit and vegetable conveyor machine according to claim 1, wherein each connection element has indentations which enable fixing to the traction cable and to the stud bolt by means of set screws.

8. The fruit and vegetable conveyor machine according to claim 1, wherein the traction cables are made of steel.

* * * * *

UNITED STATES PATENT AND TRADEMARK OFFICE
CERTIFICATE OF CORRECTION

PATENT NO. : 12,214,963 B2  
APPLICATION NO. : 18/252444  
DATED : February 4, 2025  
INVENTOR(S) : Soler León et al.

Page 1 of 1

It is certified that error appears in the above-identified patent and that said Letters Patent is hereby corrected as shown below:

In the Claims

In Column 7, Claim 1, Line 11, after "notches of the" insert --connection elements travel over the projections of the--.

In Column 8, Claim 7, Line 25, after "by" delete "means of".

Signed and Sealed this  
Twenty-fifth Day of March, 2025

Coke Morgan Stewart  
*Acting Director of the United States Patent and Trademark Office*